United States Patent [19]
Okada

[11] Patent Number: 5,922,053
[45] Date of Patent: Jul. 13, 1999

[54] METHOD FOR EFFECTING MUTUAL TRANSMISSION OF DATA BETWEEN INDIVIDUAL MACHINE UNITS USING SIMULTANEOUS PARALLEL TRANSFERS AND A SYSTEM THEREOF

[75] Inventor: Masahiro Okada, Kobe, Japan

[73] Assignee: Konami Co., Ltd., Hyogo-ken, Japan

[21] Appl. No.: 08/816,473

[22] Filed: Mar. 13, 1997

Related U.S. Application Data

[63] Continuation of application No. 08/350,560, Dec. 7, 1994, abandoned.

[30] Foreign Application Priority Data

Dec. 9, 1993 [JP] Japan ................................. 5-309512

[51] Int. Cl.$^6$ .................................................. G06F 15/16
[52] U.S. Cl. ......................................... 709/238; 463/42
[58] Field of Search .......................... 395/800.01, 800.1, 395/800.28, 800.32, 200.3, 200.31, 200.38, 200.43, 200.68, 670, 280, 291, 306, 840, 841, 851–855; 711/100, 114, 130, 147; 364/131–134; 463/31, 41, 42, 43; 709/229, 243; 712/1, 25, 32; 370/486

[56] References Cited

U.S. PATENT DOCUMENTS

| | | |
|---|---|---|
| 4,193,598 | 3/1980 | Freese ........................................ 463/31 |
| 4,521,014 | 6/1985 | Sitrick ........................................ 463/31 |
| 4,572,509 | 2/1986 | Sitrick ........................................ 463/31 |
| 4,614,342 | 9/1986 | Takashima ................................ 273/85 |
| 4,631,666 | 12/1986 | Harris et al. ............................. 364/200 |
| 4,866,604 | 9/1989 | Reid ........................................ 711/106 |
| 4,998,199 | 3/1991 | Tashiro et al. ........................... 364/410 |
| 5,136,700 | 8/1992 | Thacker ................................... 711/122 |
| 5,273,288 | 12/1993 | Teshima et al. ........................ 273/237 |
| 5,350,176 | 9/1994 | Hochstein et al. ........................ 463/42 |
| 5,442,771 | 8/1995 | Filepp et al. ............................. 395/650 |
| 5,519,880 | 5/1996 | Okabayashi ........................ 395/800.11 |

*Primary Examiner*—Larry D. Donaghue
*Attorney, Agent, or Firm*—Jordan and Hamburg LLP

[57] ABSTRACT

A method for transmitting data of one of three or more unit machines to another unit machine, each unit machine including a computer provided with a memory for storing data. The method includes connecting the respective computers of all the unit machines in parallel with one another; and rendering the computer of one unit machine transmit its data to the computers of the other unit machines, and rendering the computer of another unit machine transmit its data to the computers of the other unit machines after the computer of the one unit machine completes its data transmission.

8 Claims, 5 Drawing Sheets

PRIOR ART

PRIOR ART

METHOD FOR EFFECTING MUTUAL TRANSMISSION OF DATA BETWEEN INDIVIDUAL MACHINE UNITS USING SIMULTANEOUS PARALLEL TRANSFERS AND A SYSTEM THEREOF

This application is a continuation of application Ser. No. 08/350,560, filed Dec. 7, 1994, now abandoned.

BACKGROUND OF THE INVENTION

This invention generally pertains to a system including a plurality of machine units each provided with an internal computer and, more particularly, relates to a method of mutually transmitting data between individual machine units.

Various types of game machines used in amusement businesses are known examples of a local area network (hereinafter referred to as LAN) system which comprises discrete devices (or unit machines) each incorporating a computer of the same performance level. It is known that some of these game machines are constructed in such a manner that individual machine units can operate fully independently of other machine units, while they can also work interactively, allowing each player to compete with other players.

In various systems comprising a plurality of machine units interacting with each other, like the aforementioned game machines, it is essential that various data generated in one machine be sent to the other machines so that each machine can work in a proper interrelationship with the other machines. For this reason, operation data and processed data are exchanged between one user machine and another in such systems.

FIG. 4 is a general arrangement diagram showing a conventional method in mutual data transmission. As depicted in the diagram, a LAN system 1 comprises five computers, that is, a first computer 11, a second computer 12, a third computer 13, a fourth computer 14 and a fifth computer 15, individually contained in separate machines. These computers 11–15 incorporates first to fifth memories 21–25, respectively. Data produced as a result of user operations at the individual machines are entered and stored in the respective internal memories 21–25. These data are exchanged between different computers each time the data are updated or at appropriate time intervals.

FIG. 5 is a diagram illustrating a typical structure of the aforementioned transmitted data. Each set of data 4 includes a predefined number of bits, e.g., 1 kilobit (=$2^{10}$bits=1024 bits) as illustrated. Such data is exchanged between the individual computers 11–15 of the LAN system 1 via a communications network 3 which connects the computers 11–15 in series.

The communications network 3 includes, for example, a first transmission way 31 between the first and second computers 11–12, a second transmission way 32 between the second and third computers 12–13, a third transmission way 33 between the third and fourth computers 13–14, and a fourth transmission way 34 between the fourth and fifth computers 14–15, as illustrated in FIG. 4. Data 4 stored in the first memory 21 is transmitted to the second memory 22 via the first transmission way 31 at the beginning. Then, data 4 stored in the second memory 22, including the data 4 received from the first memory 21, is transmitted to the third memory 23 via the second transmission way 32. This data transmission process is sequentially executed until data 4 stored in the fourth memory 24 is transmitted to the fifth memory 25 via the fourth transmission way 34. Thereafter, data 4 is transmitted from the fifth memory 25 to the fourth memory 24 via the fourth transmission way 34, from the fourth memory 24 to the third memory 23 via the third transmission way 33, and so on up to the first memory 21 in succession.

FIGS. 6A–6D and 7A–7D depict the concept of the aforementioned data transmission sequence. In these diagrams, data 4 stored in the first to fifth memories 21–25 at the beginning are expressed as different sets of data items, that is, first data 4a, second data 4b, third data 4c, fourth data 4d and fifth data 4e, respectively. Among the four transmission ways 31–34, an active transmission way (through which data is currently flowing) is represented by a thick line with arrow. Furthermore, data 4 just transmitted through an active transmission way shown by a thick line with arrow is shaded with a halftone dot pattern.

More particularly, the first data 4a in the first memory 21 is transmitted via the first transmission way 31 and stored into the second memory 22 as shown by dot shading in FIG. 6A at first. Next, the first data 4a and second data 4b stored in the second memory 22 are transmitted together via the second transmission way 32 and stored into the third memory 23 as shown in FIG. 6B. The first data 4a, second data 4b and third data 4c stored in the third memory 23 are transmitted together via the third transmission way 33 and stored into the fourth memory 24 as shown in FIG. 6C. The first to fourth data 4a–4d stored in the fourth memory 24 are then transmitted together via the fourth transmission way 34 and stored into the fifth memory 25 as shown in FIG. 6D.

After the above-described sequence of forward-going data transmission, data 4 is transmitted in the backward direction starting from the fifth memory 25 down to the first memory 21 to fill up insufficiencies of their data contents.

Specifically, the fifth data 4e is transmitted to the th memory 24 via the fourth transmission way 34 as shown in FIG. 7A at first. The fourth data 4d and fifth data 4e are transmitted to the third memory 23 via the third transmission way 33 as shown in FIG. 7B. The third data 4c, fourth data 4d and fifth data 4e are transmitted to the memory 22 via the second transmission way 32 as shown in FIG. 7C. Then, the second to fifth data 4b–4e are transmitted to the first memory 21 via the first transmission way 31 as shown in FIG. 7D so that all the memories 21–25 eventually have the same data 4a–4e.

According to the above-described conventional method in mutual data transmission, if the LAN system 1 comprises five computers, eight steps are required to complete a data transmission sequence. Generally, if the LAN system 1 comprises n computers, (n−1)×2 steps of data transmission are required. This means that the conventional method entails an extremely complicated data transmission sequence.

Furthermore, assuming that the length of data 4 is 1 kilobit and each step of data transmission takes one second, for instance, 20 kilobits of data must be exchanged to complete data transmission to all the machines, requiring 20 seconds in total, in the example shown in FIGS. 6A–6D and 7A–7D.

Another known approach is to form a ring network by providing an additional transmission way to connect between the first computer 11 and fifth computer 15 as shown by an alternate long and short dash line in FIG. 4. In this approach, it will be possible to reduce the overall data transmission time if all the computers 11–15 in the ring network are arranged to transmit and receive data 4 in synchronism with each other. However, there exist considerable technical difficulties in synchronizing their transmit and receive operations. Another problem of this arrangement is that if a failure occurs in one of the computers 11–15, it becomes impossible to transmit data 4 to the other computers.

SUMMARY OF THE INVENTION

It is an object of the present invention to provide a method for mutually transmitting data which has overcome the aforementioned problems in the prior art.

It is another object of the present invention to provide a method for mutually transmitting data which can reduce the data transmission time in total, and eliminate the likelihood that a failure in one of a plurality of computers constituting a system will affect data transmission between the other computers.

A data transmission method of the present invention is adapted for transmitting data of one of three or more machine units to another machine unit, each unit machine including a computer provided with a memory for storing data. The data transmission method comprises the steps of: connecting the respective computers of all the machine units in parallel with one another by a data transmission way; and rendering the computer of one machine unit to transmit its data to the computers of the other machine units, and rendering the computer of another machine unit to transmit its data to the computers of the other machine units after the computer of the one machine unit completes its data transmission.

It may be appreciated to provide each data with an identification portion indicative of the computer from which it was transmitted. Each data may be made of a number of bits in series and the transmission way is made of a single transmission line.

Further, in the case of each machine unit being provided with an operating portion for entering data into the computer, it may be appreciated to execute the data transmission of one computer to the other computers in synchronism with the timing of data input.

In the above-mentioned data transmission method, the computers are connected with one another in parallel by the data transmission way. Data in one computer is transmitted to all the other computers at the same time. After the data transmission is completed, data in the next computer is also transmitted to the other computers. These data transmissions are executed in a predetermined sequence.

In this method, data of one computer is transmitted to all the other computers at one time. Accordingly, all the computers can share the data generated respectively in other computers after a reduced number of data transmissions, so that the transmission time can be reduced.

Also, each data has the identification portion indicating the computer which generated the data, which will facilitate subsequent data processing operations. Further, each data is in a serial form and the transmission way is made of a single transmission line. This will reduce the number of signal lines in the transmission way.

The data transmission is executed in synchronism with the timing of data input. Accordingly, each time new data is input to one computer, it can be assuredly transmitted to the other computers.

These and other objects, features and advantages of the invention will be made more apparent in the following detailed description of preferred embodiments, which are illustrated in the accompanying drawings.

DETAILED DESCRIPTION OF THE PREFERRED EMBODIMENT OF THE INVENTION

Figure 1:
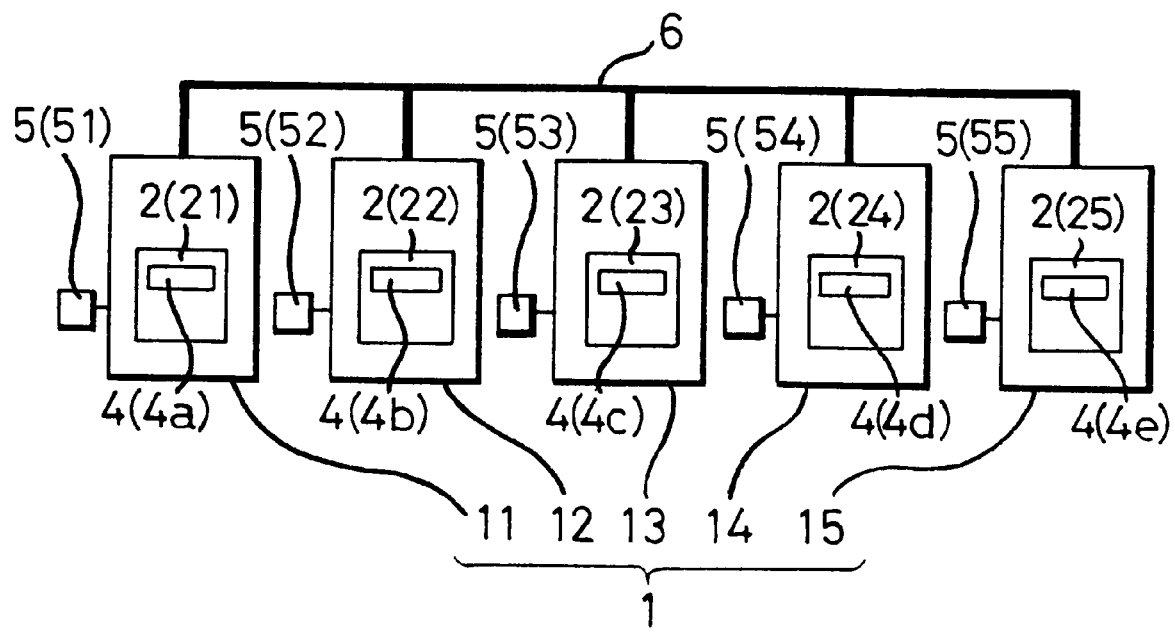
FIG. 1 is a diagram showing a general data transmission arrangement in which a data transmission method of the present invention is carried out.

FIG. 1 is a diagram showing a general arrangement in which a method for mutually transmitting data is embodied as a preferred embodiment of the present invention.

As illustrated, a LAN system 1 comprises five computers, that is, a first computer 11, a second computer 12, a third computer 13, a fourth computer 14 and a fifth computer 15, individually contained in separate machines. It is to be noted here that the number of computers contained in the LAN system 1 is not limited to five. There may be less than or more than five computers depending on specific system requirements.

Furthermore, the present invention may be applied for a LAN system which enables mutual communication between only some in-work computers of a number of computers which are connected with one another by a communication line.

The first to fifth computers 11–15 are respectively provided with operating portions, i.e., first operating portion 51, second operating portion 52, third operating portion 53, fourth operating portion 54 and fifth operating portion 55, for entering necessary data, as well as first memory 21, second memory 22, third memory 23, fourth memory 24 and fifth memory 25, each comprising a random access memory (hereinafter referred to as RAM), for example. Data 4 fed from the operating portion of each machine is entered directly, or after a specified processing, into one of the memories 21–25. In the case of amusement game machines, each operating portion 5 includes a manipulating device for manipulating game characters in electrical signals.

First data 4a, second data 4b, third data 4c, fourth data 4d and fifth data 4e are entered into the first memory 21, second memory 22, third memory 23, fourth memory 24 and fifth memory 25, respectively. Data 4 stored in each memory 2 is transferred to the other computers, synchronized at consecutive data input timing or at appropriate time intervals.

Figure 2:
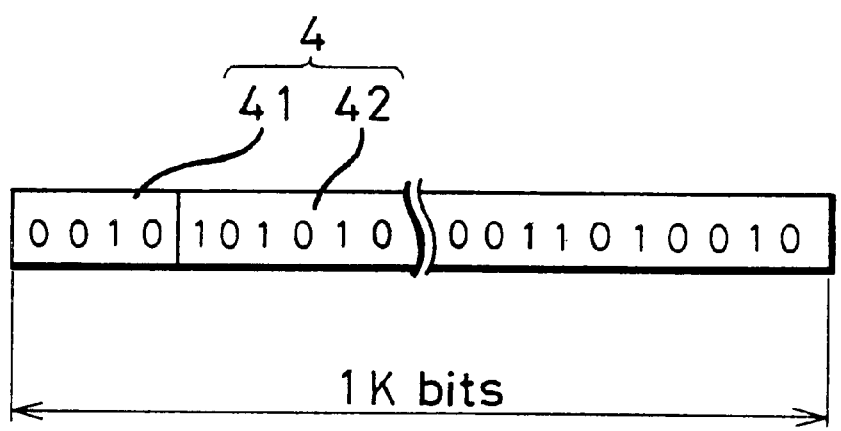
FIG. 2 is a diagram showing a data bit structure in the data transmission method.

FIG. 2 is a diagram showing a data structure in this data transmission. As shown in FIG. 2, an address block 41 for identifying each individual machine is assigned to the first 4 bits of data 4, for example. Including a unique identification number or symbol of a corresponding machine, the address block 41 makes it possible to determine from which machine data 4 has been received.

The address block 41 is followed by a data block 42 which contains data entered at a particular machine or processed therein. In various forms of multi-terminal parallel systems such as computer system terminals, game machines, cash dispensers, vending machines, ticket vending machines and automatic ticket checkers, it is often the case that all the interconnected terminals work in close association with each other. For this reason, it is necessary for all the terminal machines to share information contained in the data block 42 and, therefore, data 4 is transmitted from one machine to the others. Contents of information to be included in the data block 42 are determined in accordance with specific types of parallel systems.

In this embodiment, each set of data 4 is set to include 1 kilobit (=$2^{10}$ bits=1024 bits), of which 4 bits are used for the address block 41, for instance. It is to be noted, however, that the length of the address block 41 is not limited to 4 bits. The remaining portion of the whole data length is used as the data block 42. A data transmission way 6 is adapted for transmitting data 4 from one computer to another within the LAN system 1. Data 4 can be entered from the operating portion 5 into the memory 2 of each machine and sent out from the memory 2 to the transmission way 6. Therefore, each computer can transmit the data 4 stored in its memory 2 to all the other computers via the transmission way 6.

Figure 3:
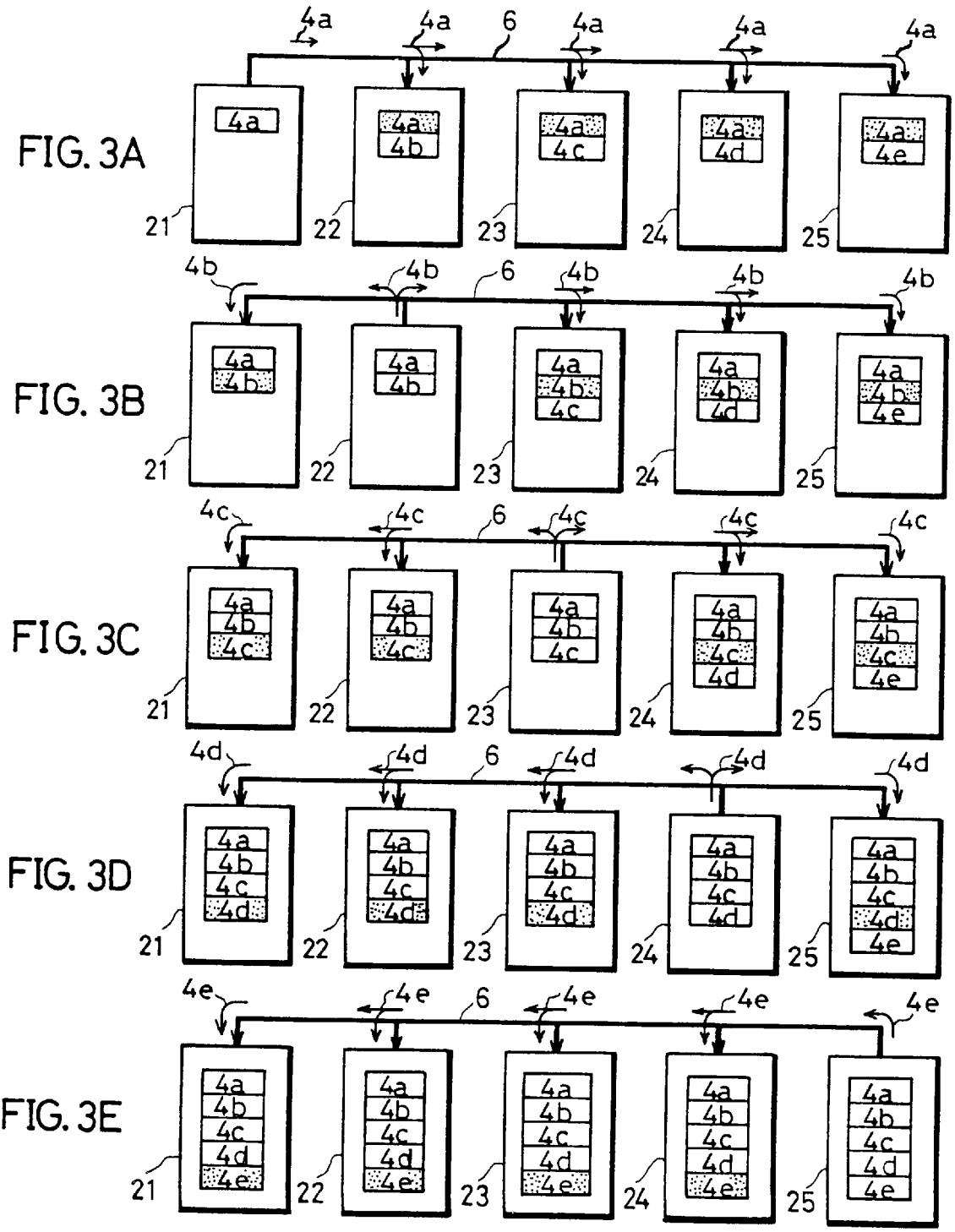
FIGS. 3A–3E are conceptual diagrams showing a step-by-step sequence of transmitting first to fifth data, respectively, in the data transmission method.
Figure 4:
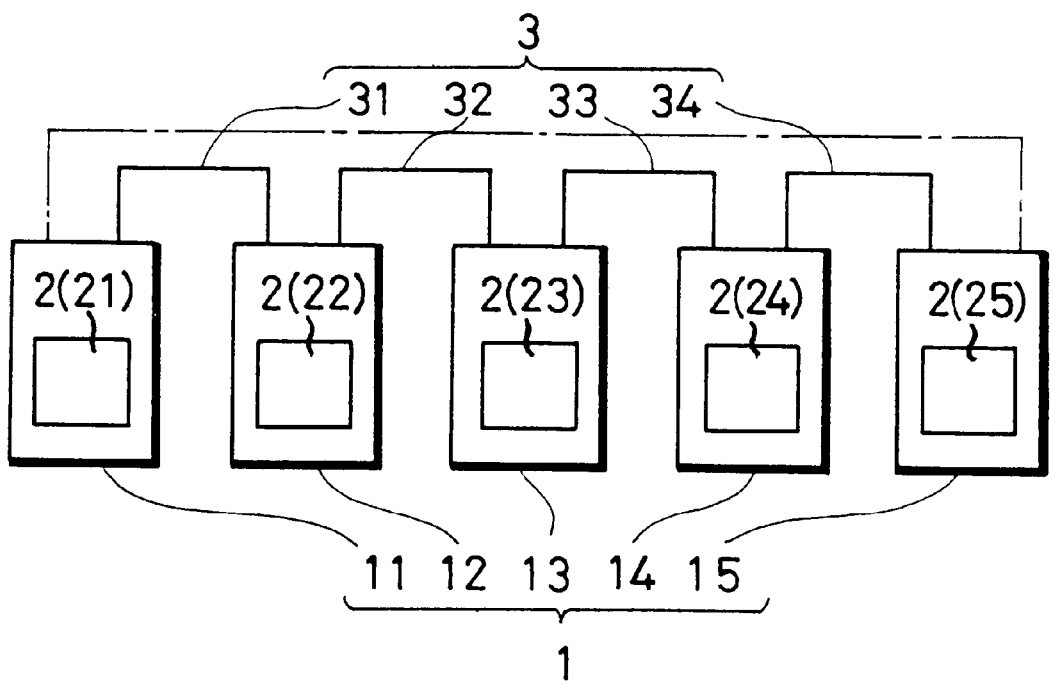
FIG. 4 is a diagram showing a general arrangement for a conventional data transmission method.
Figure 5:
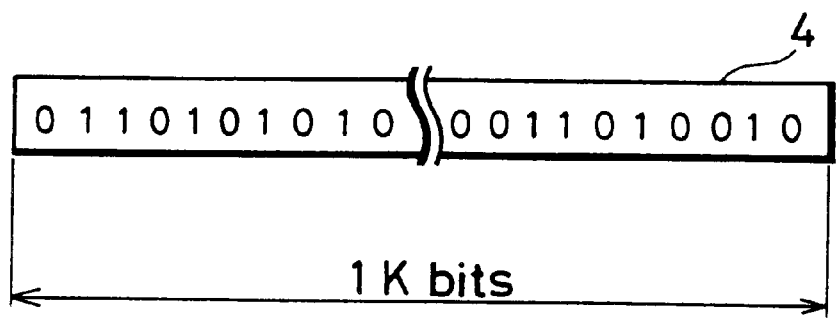
FIG. 5 is a diagram showing a data bit structure in the conventional data transmission method.
Figure 6A:
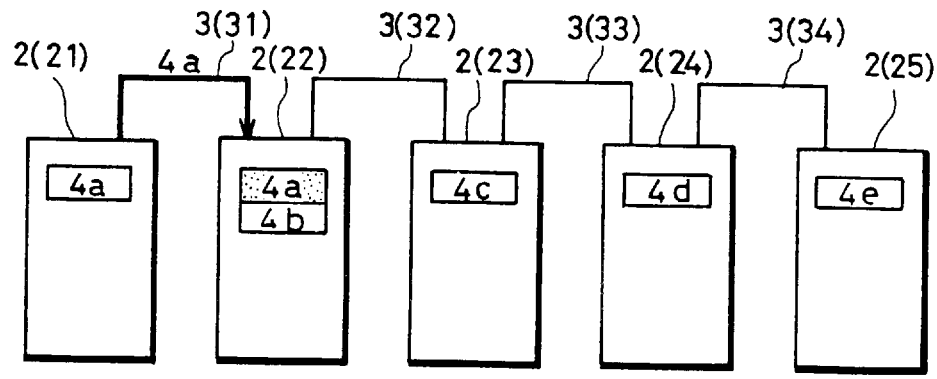
FIGS. 6A–6D are conceptual diagrams showing a step-by-step sequence of forward-going transmission of the first to fourth data in the conventional data transmission method.
Figure 6B:
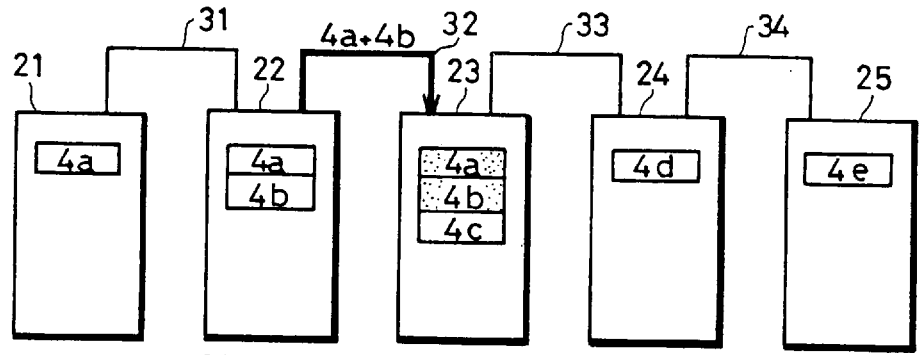
Figure 6C:
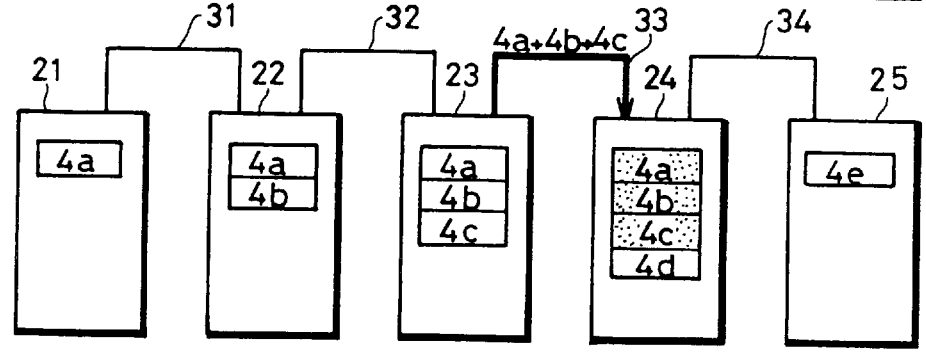
Figure 6D:
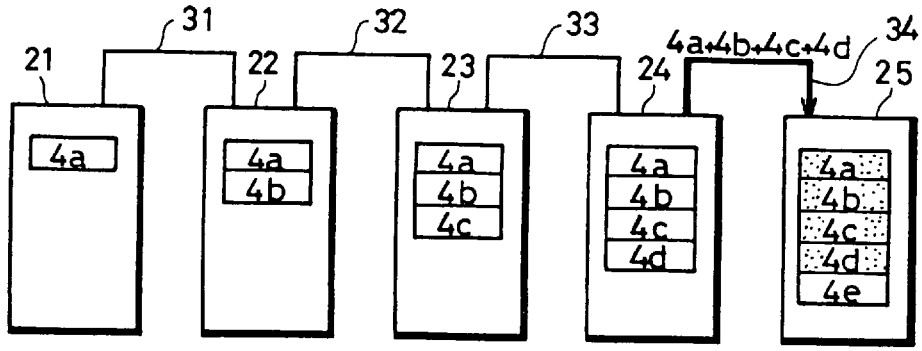
Figure 7A:
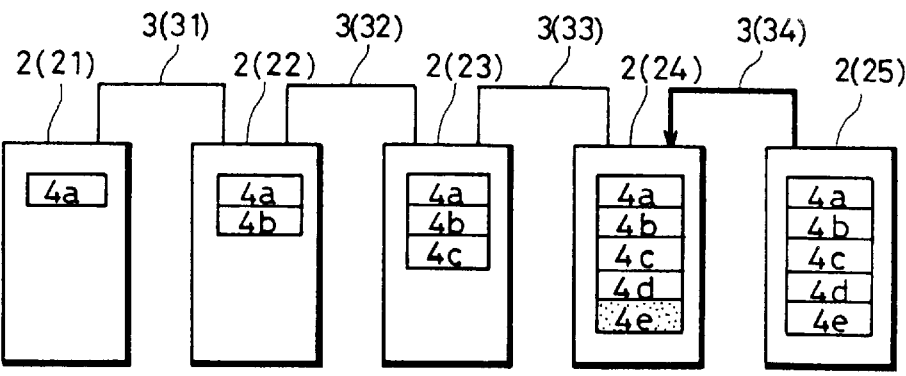
FIGS. 7A–7D are conceptual diagrams showing a step-by-step sequence of backward-going transmission of the fifth to second data in the conventional data transmission method.
Figure 7B:
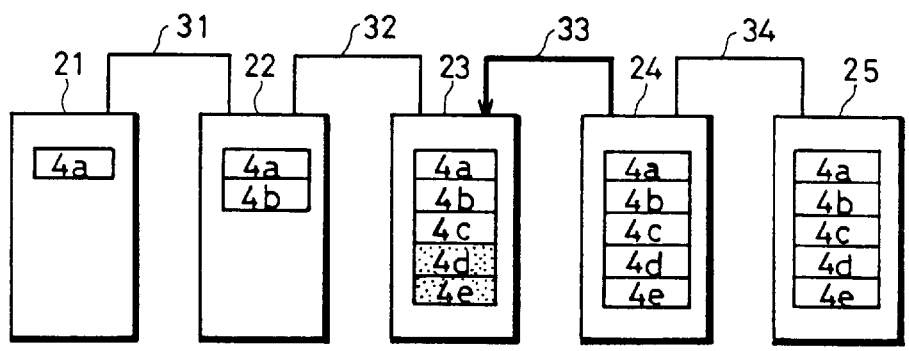
Figure 7C:
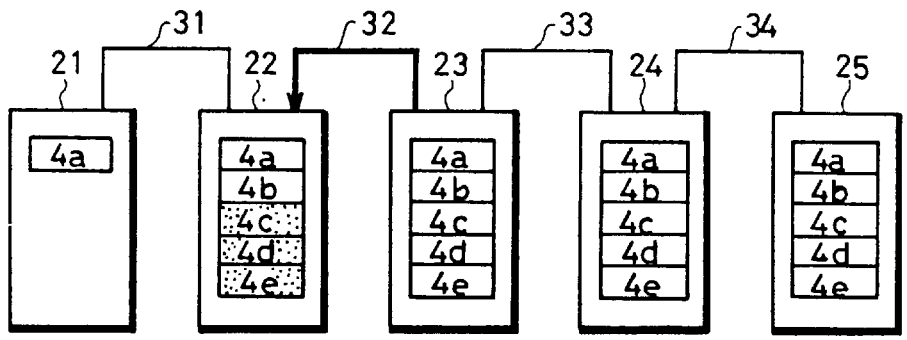
Figure 7D:
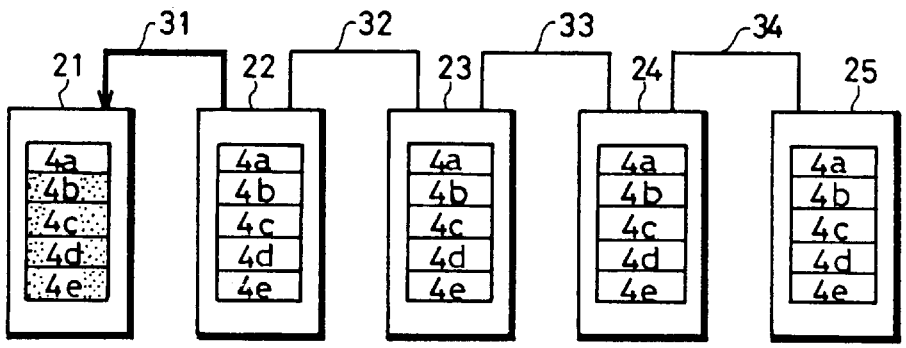

Referring now to FIGS. 3A–3E, this mutual data transmission method will be described in detail. FIGS. 3A–3E are block diagrams showing a step-by-step sequence of the mutual data transmission method, where FIG. 3A shows transmission of first data 4a that has originated from the first memory 21, FIG. 3B shows transmission of second data 4b that has originated from the second memory 22, FIG. 3C shows transmission of third data 4c that has originated from the third memory 23, FIG. 3D shows transmission of fourth data 4d that has originated from the fourth memory 24, and FIG. 3E shows transmission of fifth data 4e that has originated from the fifth memory 25.

First, the first data 4a stored in the first memory 21 of FIG. 1 is transmitted simultaneously to the second memory 22 of the second computer 12, the third memory 23 of the third computer 13, the fourth memory 24 of the fourth computer 14 and the fifth memory 25 of the fifth computer 15, as depicted in FIG. 3A. In other words, the first data 4a is transmitted from the first memory 21 and stored in the second memory 22, third memory 23, fourth memory 24 and fifth memory 25 as shown by dot shading in this first step of the data transmission sequence.

Provided that the above step of data transmission takes one second, the second computer 12 recognizes one second from the beginning that the received data 4a was from the first computer 11 by reference to data contents of the address block 41. The second computer 12 also recognizes that it is time to transmit its data 4b to the other computers. At the end of data transmission from the first computer 11, the second computer 12 transmits the second data 4b to the other computers. Subsequently, the third to fifth computers 13–15 transmit their data 4c–4e in successive steps as described below.

Referring to FIG. 3B, the second data 4b initially stored in the second memory 22 of the second computer 12 is transmitted simultaneously to the first memory 21 of the first computer 11, the third memory 23 of the third computer 13, the fourth memory 24 of the fourth computer 14 and the fifth memory 25 of the fifth computer 15 via the transmission way 6. This second step of the data transmission sequence adds the second data 4b to the contents of the first memory 21, third memory 23, fourth memory 24 and fifth memory 25 as shown by dot shading.

In FIG. 3C, the third data 4c initially stored in the third memory 23 of the third computer 13 is transmitted simultaneously to the first memory 21 of the first computer 11, the second memory 22 of the second computer 12, the fourth memory 24 of the fourth computer 14 and the fifth memory 25 of the fifth computer 15 via the transmission way 6. This third step of the data transmission sequence adds the third data 4c to the contents of the first memory 21, second memory 22, fourth memory 24 and fifth memory 25 as shown by dot shading.

In FIG. 3D, the fourth data 4d initially stored in the fourth memory 24 of the fourth computer 14 is transmitted simultaneously to the first memory 21 of the first computer 11, the second memory 22 of the second computer 12, the third memory 23 of the third computer 13 and the fifth memory 25 of the fifth computer 15 via the transmission way 6. This fourth step of the data transmission sequence adds the fourth data 4d to the contents of the first memory 21, second memory 22, third memory 23 and fifth memory 25 as shown by dot shading.

Lastly in FIG. 3E, the fifth data 4e initially stored in the fifth memory 25 of the fifth computer 15 is transmitted simultaneously to the first memory 21 of the first computer 11, the second memory 22 of the second computer 12, the third memory 23 of the third computer 13 and the fourth memory 24 of the fourth computer 14 via the transmission way 6. This fifth step of the data transmission sequence adds the fifth data 4e to the contents of the first memory 21, second memory 22, third memory 23 and fourth memory 24 as shown by dot shading.

The above-described five-step sequence ensures transmission of the first to fifth data 4a–4e originally acquired by the first to fifth memories 21–25, respectively, to the individual machines.

Comparing the five-step data transmission method of the present invention with the conventional method described in FIGS. 6 and 7, the number of steps required for completing one data transmission sequence is reduced from eight to five and the total amount of transmitted data is reduced from 20 kilobits to 5 kilobits. Assuming that one second is required to transmit 1 kilobit of data, the total data transmission time is reduced from 20 seconds to 5 seconds. It will be appreciated therefore that the invention contributes to substantial time savings in data transmission.

As an example, the method of the present invention can be effectively applied to a multi-player game machine system for transmitting data between one machine and another. In such a system it is required to transmit data on each player's actions and subsequent machine responses from one machine to all the other machines. Furthermore, data transmission is to be made in both directions at certain time intervals which will be specified depending on the type of game machines. In a game machine system, mutual data transmission must be performed at a higher rate. If it contains five terminal machines and one data transmission step requires 10 msec, its data transmission interval is usually set to 50 msec.

As mentioned above, in the mutual data transmission method of the present invention, a plurality of computers are connected with one another in parallel by a single way. Data of one computer is transmitted to the other computers at one time.

Accordingly, compared to the conventional method of mutual data transmission in which data is transmitted from one computer to another in a step-by-step manner, the method of the present invention makes it possible to reduce the amount of transmitted data and data transmission time in total.

Also, compared to another conventional method employing a ring network transmission way in which data is transmitted and received simultaneously between adjacent computers, the method of the present invention permits data transmission from each individual computer to all the other computers simply and quickly without requiring complicated operation like the simultaneous transmit/receive process. Furthermore, in the ring network configuration, a failure in one computer renders all the remaining computers inoperable. According to the invention, exchange of data is still possible between non-defective computers.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A method for transmitting data in an apparatus having a plurality of machine units each connected in parallel to a common transmission bus, each of said machine units including a memory for storing data, transmission means for transmitting and receiving data on said transmission bus, and processing means for processing data stored in said memory, the method comprising the steps of:

(a) transmitting data from one of the machine units simultaneously to all others of the machine units;
    (b) transmitting data from a next one of said machine units simultaneously to all others of the machine units according to a predetermined order; and
    progressively repeating step (b) following completion of step (b) until all the machine units have transmitted data to all others of the machine units and each of said machine units has an identical set of data comprised of said data transferred from said other machine units.

2. A method of transmitting data as defined in claim 1, wherein each of said data includes an identification portion indicative of the machine unit from which it was transmitted.

3. A method of transmitting data as defined in claim 2, wherein the transmission bus is a single transmission line.

4. A method of transmitting data as defined in claim 1, wherein each of said machine units further includes an operating portion for entering data into the computer, and the data transmission of one of the machine units to the other machine units is executed in synchronism with the timing of data input.

5. The data transmission method as defined in claim 1 wherein each of said data transmitted consists of a fixed number of bits in series and the transmission bus is a single transmission line.

6. An apparatus comprising:
    1st to nth machine units, wherein n is at least 3;
    a data bus connecting said 1st to nth machine units in parallel; and
    each of said 1st to nth machine units including:
        a memory including data having an identifier for identifying which of said 1st to nth machine units said data originates from;
        transmission means for transmitting and receiving data and recognizing said identifiers; and
        control means for controlling said transmission means to simultaneously transmit said data to all others of said 1st to nth machine units in a predetermined sequence wherein said transmission of data begins with transmission by said 1st machine and sequentially progresses until said nth machine unit effects transmission subsequent to which said predetermined sequence repeats, said control means including means for determining a termination of a data transmission of an immediately preceding one of said 1st to nth machine units in said predetermined sequence and effecting said transmission upon determination of said termination whereby each of said 1st to nth machine units has an identical set of data comprised of said data transferred from said other 1st to nth machine units.

7. The apparatus of claim 6 wherein said means for determining termination of a data transmission includes means for detecting a beginning of said data transmission and timing means, responsive to a detection of said beginning of said data transmission, for determining an elapse of a predetermined amount of time allotted for said data transmission and determining that termination of said data transmission has occurred at said elapse of said predetermined amount of time.

8. An apparatus comprising:
    1st to nth machine units, wherein n is at least 3;
    a data bus connecting said 1st to nth machine units in parallel; and
    each of said 1st to nth machine units including:
        a memory including data having an identifier for identifying which of said 1st to nth machine units said data originates from;
        transmission means for transmitting and receiving data and recognizing said identifiers; and
        control means for controlling said transmission means to transmit said data simultaneously to all others of said 1st to nth machine units in a predetermined sequence wherein said transmission of data begins with transmission by said 1st machine to said $2^{nd}$ to $n^{th}$ machine units simultaneously and sequentially progresses until said nth machine unit effects transmission to said $1^{st}$ to $(n-1)^{th}$ machine units simultaneously subsequent to which said predetermined sequence repeats, said control means including means for determining a termination of a data transmission of an immediately preceding one of said 1st to nth machine units in said predetermined sequence and effecting said transmission upon determination of said termination whereby each of said 1st to nth machine units has an identical set of data comprised of said data transferred from said other 1st to nth machine units.

* * * * *